J. A. McCALLUM.
AUTOMATIC LUBRICATOR FOR JOURNAL BEARINGS.
APPLICATION FILED DEC. 23, 1911.

1,039,426.

Patented Sept. 24, 1912.

Witnesses:
P. J. Gathmann
E. D. Frangoni

Inventor:
J. A. McCallum,
By his Attorneys
Baldwin Wight

UNITED STATES PATENT OFFICE.

JOSEPH ALBERT McCALLUM, OF CRESTLINE, OHIO.

AUTOMATIC LUBRICATOR FOR JOURNAL-BEARINGS.

1,039,426. Specification of Letters Patent. Patented Sept. 24, 1912.

Application filed December 23, 1911. Serial No. 667,472.

*To all whom it may concern:*

Be it known that I, JOSEPH ALBERT Mc-CALLUM, a subject of the King of Great Britain, residing in Crestline, in the county of Crawford and State of Ohio, have invented certain new and useful Improvements in Automatic Lubricators for Journal-Bearings, of which the following is a specification.

The object of my invention is to provide improved means for automatically lubricating journals and bearings when they become heated and require the supply of additional lubricating material.

My improvements are especially intended for use in connection with the axle boxes of railway cars but may be applied to journals and bearings of various kinds.

In carrying out my invention I provide a vessel or reservoir containing oil or other suitable liquid lubricating material and connect said reservoir with the journal box or bearing by suitable pipes or conduits. The discharge end of the pipe or conduit is arranged close to the journal and is normally closed by some suitable material which will confine the lubricant but which will melt at a relatively low temperature and permit the lubricant to flow to the journal when the latter is heated. Preferably the lubricating material is fed by gravity through a vertical pipe which connects with a horizontally arranged pipe containing a tube having its outer end closed by the fusible material and which is pressed by a spring toward the journal box. The spring is arranged within the horizontal pipe and the discharge end of the tube is preferably closed by a stopper which is removably connected with the tube and contains a chamber, the walls of which are perforated and within which the fusible material is contained.

Figure 1:
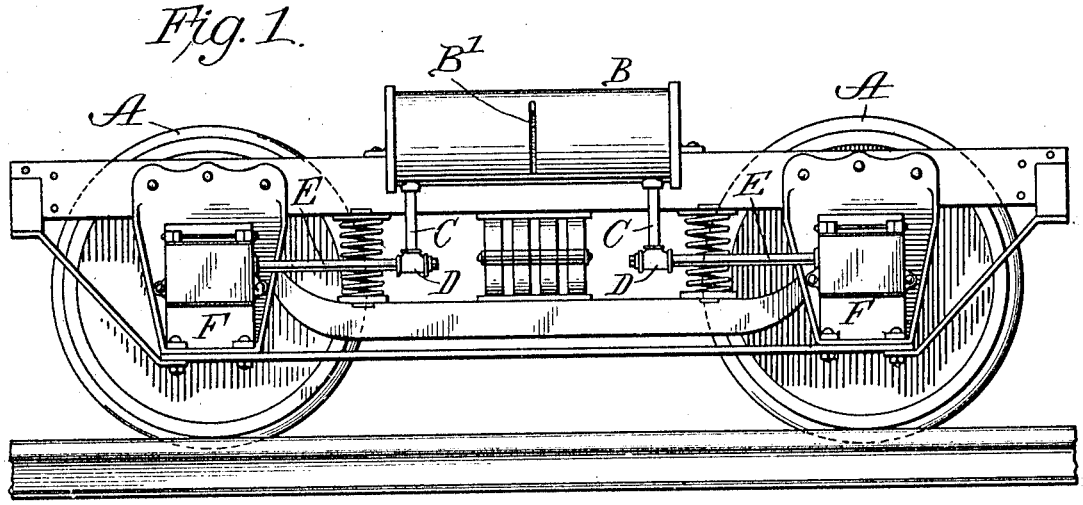
Figure 2:
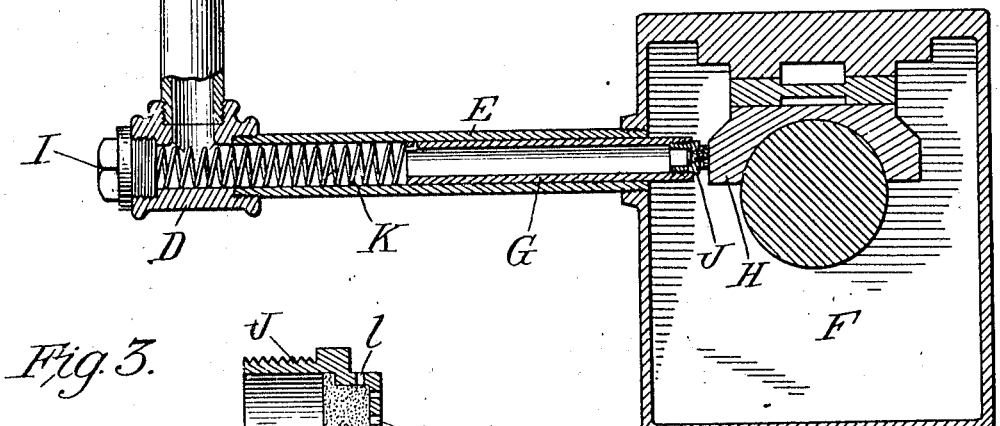
Figure 3:

In the accompanying drawings, Figure 1 shows a side elevation of a car truck with my improvements applied. Fig. 2 is a view on an enlarged scale partly in elevation and partly in section showing my improvements. Fig. 3 is a detail view on an enlarged scale and in section of the stopper containing fusible material.

By way of illustration I have shown my improvements applied to a car truck A.

B indicates a vessel or reservoir for the lubricating material.

B' indicates a gage of well known construction.

I have shown two pipes C connected with the reservoir B but as these pipes are precisely the same in construction and are connected with other parts of similar construction I will only describe one of the connections between the reservoir and an axle box.

The pipe C connects with a coupling D to which is connected a horizontally arranged pipe E in turn connected with the axle box F. Within the pipe E is a tube G which is adapted to slide within the pipe and carries at its outer or discharge end a stopper J containing fusible material M. The tube G is pressed toward the bearing block H of the journal by a spring K which bears also against a removable screw plug I. The tension of the spring may be adjusted by the plug I and when the plug is removed the spring and the tube G to which it is attached may be withdrawn. The discharge end of the tube G may be closed in various ways. I prefer however to employ a screw plug J having a threaded portion $j$ adapted to engage a correspondingly threaded portion at the end of the tube. The stopper contains a chamber L to receive the fusible material M, and the front wall of this chamber is perforated as indicated at $l$. The stopper is preferably made of brass and is of such strength and durability as to be practically unbreakable and will not soon wear out. Normally the fusible material M prevents oil from passing out through the discharge end of the tube but should the journal become heated and require additional lubrication the heat from the bearing block H will be imparted directly to the end of the stopper J and the material M will be melted and flow out through the openings $l$ and the lubricating oil will then follow. In this way lubricating material is held in reservation and only used when required, but it is automatically supplied when the journals become heated.

It is not necessary to often renew any of the parts. It is only necessary to remove the stopper J and refill it with fusible material when the latter has been melted.

It will be observed that the fusible material may be renewed without disconnecting the pipes C and E from the reservoir or the axle box. By unscrewing the plug I, the spring K and the tube G with the stopper J may be removed, the stopper J detached and refilled and then after the stopper is replaced the tube and spring may be passed into the pipe E and held in place by the plug I, the stopper J being firmly pressed against the bearing block H.

I claim as my invention:

1. The combination with a journal box of a reservoir for lubricating material, a pipe connection between the reservoir and the box, a stopper within the journal box detachably connected with and projecting from the discharge end of the pipe which has an opening through it for the exit of the lubricant and is yieldingly held against a part of the journal box near the journal, and fusible material contained within the stopper which normally closes the opening thereof.

2. The combination with a journal box of a reservoir for lubricating material, a pipe connection between the reservoir and the box, a stopper within the journal box detachably connected with the discharge end of the pipe and which has an opening through it for the exit of the lubricant, a spring connected with the stopper and which presses it against a part of the journal box, and fusible material contained within said stopper and normally closing the opening therein.

3. The combination with a journal box of a reservoir for lubricating material, a pipe connection between the reservoir and the box, a lubricant-conveying tube movable in said pipe connection, a stopper detachably connected with the discharge end of said tube having an opening through it for the exit of the lubricant, a spring for pressing the tube outward toward the journal, and fusible material contained within said stopper which normally closes the opening therein.

4. The combination of a journal box, a reservoir for lubricating material, a pipe connection extending from the reservoir to the interior of the box for conveying lubricant from the reservoir and discharging it into the box, and a stopper extending into the discharge end of the pipe and detachably connected therewith, said stopper having a perforated outer end and being provided on its inside with a chamber for fusible material, and fusible material contained in said chamber and normally closing said perforations.

5. The combination with a reservoir for lubricating material, of a journal box, pipe connections between the reservoir and the journal box, a lubricant-conveying tube telescoping with the pipe connections, a stopper attached to the discharge end of the tube and having an opening through it, fusible material contained in the stopper, a spring pressing the tube outward toward the journal, and a screw plug against which the spring presses.

In testimony whereof, I have hereunto subscribed my name.

JOSEPH ALBERT McCALLUM.

Witnesses:
HELEN HORNING,
W. D. MEWHORT.